(12) United States Patent
Yagnik

(10) Patent No.: US 9,501,497 B1
(45) Date of Patent: *Nov. 22, 2016

(54) LOCATION QUERY PROCESSING

(71) Applicant: Google Inc., Mountain View, CA (US)

(72) Inventor: Niyati Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,793

(22) Filed: Aug. 12, 2014

Related U.S. Application Data

(63) Continuation of application No. 13/161,757, filed on Jun. 16, 2011, now Pat. No. 8,838,621.

(60) Provisional application No. 61/447,981, filed on Mar. 1, 2011.

(51) Int. Cl.
*G06F 17/30* (2006.01)
*G06F 7/00* (2006.01)

(52) U.S. Cl.
CPC .............................. *G06F 17/30241* (2013.01)

(58) Field of Classification Search
None
See application file for complete search history.

(56) References Cited

U.S. PATENT DOCUMENTS

| | | | |
|---|---|---|---|
| 6,832,218 B1 * | 12/2004 | Emens et al. | |
| 7,246,308 B1 * | 7/2007 | Leblang ............ G06F 17/30873 | 707/E17.111 |
| 7,412,442 B1 * | 8/2008 | Vadon et al. | |
| 7,472,119 B2 * | 12/2008 | Dai et al. | |
| 7,552,113 B2 * | 6/2009 | Roe et al. | |
| 7,792,813 B2 * | 9/2010 | Selberg ............ G06F 17/30699 | 707/706 |
| 8,301,639 B1 * | 10/2012 | Myllymaki et al. .......... 707/748 |
| 8,538,956 B1 | 9/2013 | Szabadka | |
| 8,600,577 B2 * | 12/2013 | Bourque et al. .................. 701/2 |
| 8,620,915 B1 * | 12/2013 | Brukman et al. ............. 707/733 |
| 9,152,726 B2 * | 10/2015 | Lymperopoulos .. G06F 17/3087 |
| 2002/0198882 A1 * | 12/2002 | Linden et al. .................. 707/10 |
| 2005/0222981 A1 | 10/2005 | Lawrence | |
| 2006/0069616 A1 | 3/2006 | Bau | |
| 2007/0176796 A1 | 8/2007 | Bliss | |
| 2007/0239688 A1 * | 10/2007 | Clark et al. ....................... 707/3 |
| 2008/0097966 A1 * | 4/2008 | Choi et al. ......................... 707/3 |
| 2008/0154684 A1 | 6/2008 | Kniaz | |
| 2008/0270364 A1 | 10/2008 | Bayardo | |
| 2008/0301112 A1 | 12/2008 | Wu | |
| 2009/0006207 A1 | 1/2009 | Datar | |
| 2009/0063460 A1 * | 3/2009 | Selberg ............................ 707/5 |
| 2009/0132644 A1 | 5/2009 | Frishert | |
| 2009/0192986 A1 | 7/2009 | Garg | |
| 2009/0307198 A1 | 12/2009 | Zhang | |

(Continued)

*Primary Examiner* — Jeffrey A Burke
(74) *Attorney, Agent, or Firm* — Fish & Richardson P.C.

(57) ABSTRACT

Methods, systems, and apparatus, including computer programs encoded on a computer storage medium, for processing location queries. In one aspect, a method includes obtaining a location search profile for a user. The location search profile specifies, for each geographic location, a set of references to location resources that were previously requested through user interaction, by the user, with previous search results that were provided in response to a previous location query. A current location query is received from a user device that is associated with the user. In response to receiving the current location query a reference to at least one of the location resources from the set of references and search results responsive to the current location query are selected. In turn, data that cause presentation of the selected reference and the search results are provided.

25 Claims, 5 Drawing Sheets

(56) References Cited

U.S. PATENT DOCUMENTS

| | | |
|---|---|---|
| 2010/0153428 A1 | 6/2010 | Schechter |
| 2010/0250526 A1* | 9/2010 | Prochazka et al. ............ 707/723 |
| 2010/0318535 A1* | 12/2010 | Weber ................. G06F 17/3087 707/759 |
| 2010/0325129 A1* | 12/2010 | Ahuja et al. ................. 707/759 |
| 2011/0016005 A1 | 1/2011 | Li |
| 2011/0119217 A1 | 5/2011 | Moon |
| 2011/0167077 A1 | 7/2011 | Govani |
| 2011/0173217 A1 | 7/2011 | Kasperski |
| 2012/0023088 A1 | 1/2012 | Cheng |
| 2012/0143859 A1 | 6/2012 | Lymperopoulos |
| 2012/0203766 A1* | 8/2012 | Hornkvist et al. ............ 707/722 |
| 2013/0073568 A1* | 3/2013 | Federov et al. .............. 707/749 |

\* cited by examiner

LOCATION QUERY PROCESSING

CROSS-REFERENCE TO RELATED APPLICATIONS

This application is a continuation application of, and claims priority to, U.S. patent application Ser. No. 13/161,757, entitled "Location Query Processing," filed on Jun. 16, 2011, which claims the benefit under 35 U.S.C. §119(e) of U.S. Patent Application No. 61/447,981, entitled "Location Query Processing," filed on Mar. 1, 2011. The disclosures of the foregoing applications are incorporated herein by reference in their entirety for all purposes.

BACKGROUND

This specification relates to data processing and more particularly, location query processing. The Internet enables access to a wide variety of resources. For example, video, audio, webpages directed to particular subject matter, news articles, images, and other resources are accessible over the Internet. Users that are searching for information about a particular subject, place, or person often use search systems in an effort to find a resource that satisfies the user's informational need. For example, a user that is interested in locating a resource that provides information about a celebrity may use a user device to submit a search query that includes the name of the celebrity (e.g., "Ima Star"). The search system uses the search query and information about resources that are available over the Internet to generate search results that are responsive to the search query. The search results can be used to populate a search results page that is then provided to the user device from which the search query was received. The user can then request (e.g., through interaction with the search results) one or more of the resources that are referenced by the search results.

Depending on the informational needs of the user and the content of the search queries that are submitted by the user, the number of search queries that are submitted by the user and/or the number of resources that are requested through interaction with the search results can vary substantially. For example, if the user's informational need can be satisfied by obtaining a definition of the word "novel," then only a single search query (e.g., "define: novel" and/or a single resource request (e.g., a request for a dictionary page in which the word novel is defined) from the search results may be required. However, there are situations in which a user's informational need may only be satisfied by submitting many different search queries and/or requesting presentation of many different resources that were referenced by search results. For example, if a user is planning a vacation, the user's informational need may only be satisfied after submitting many different search queries (e.g., for a single destination or multiple potential destinations) and/or requesting presentation of many different resources (e.g., hotel web pages, airline web pages, or travel agency web pages). In this example, the user may submit queries and/or request resources over many different days, and it may be difficult for the user to remember which resources that the user has viewed.

SUMMARY

In general, one innovative aspect of the subject matter described in this specification can be embodied in methods that include the actions of obtaining a location search profile for a user, the location search profile specifying a plurality of geographic locations, each geographic location being a geographic location that was referenced by at least one previous location query that was previously received from a user device, the location query being a query that includes a location phrase that specifies the geographic location; and for each geographic location, a set of references to location resources that were previously requested through user interaction, by the user, with previous search results that were provided in response to the previous location query; receiving a current location query from a user device that is associated with the user, the current location query specifying a current location phrase that references a particular geographic location; and in response to receiving the current location query selecting, from the set of references for the particular geographic location, a reference to at least one of the location resources; selecting search results responsive to the current location query; and providing data that cause presentation of the selected reference; the search results; and an indication that the resource referenced by the selected reference has previously been requested by the user through user interaction with the previous search results. Other embodiments of this aspect include corresponding systems, apparatus, and computer programs, configured to perform the actions of the methods, encoded on computer storage devices.

These and other embodiments can each optionally include one or more of the following features. Obtaining the location search profile can include the actions of receiving search log data for the user, the search log data specifying one or more previous location queries that were previously submitted from a user device that is associated with the user; and for each of the previous location queries, references to previously requested location resources that were previously requested through user interaction, by the user, with previous search results that were provided in response to the previous location query; and creating a location search profile based on the search log data, the location search profile specifying, for each geographic location that was referenced by the previous location queries, a set of requested location resources that were requested though user interaction by the user with the previous search results.

Creating a location search profile can include identifying previous location queries that referenced geographic locations that are within a threshold geographic distance of each other; selecting, as members of a particular set of requested location resources, previously requested location resources that were requested through user interaction with previous search results that were provided in response to the identified previous location queries; and selecting one or more labels for the particular set of requested location resources, each label specifying a representative geographic location for the set of requested location resources.

Methods can further include the actions of determining that the location search profile includes a reference to a geographic location that matches the location phrase that reference to the particular geographic location. Selecting a reference to at least one of the location resources can include selecting a reference from the set of requested location resources for which the one or more labels references a geographic location that is within a threshold geographic distance of the particular geographic location. Selecting a reference to at least one of the location resources can include selecting a reference from the set of requested location resources for which the one or more labels references a same geographic location as the particular geographic location. Selecting a reference to at least one of the location resources further can include selecting a reference to a location resource that was most recently requested by the user.

Providing data that cause presentation of an indication that the selected reference has previously been requested by the user can include providing data that cause presentation of a date or time at which the user requested the resource that is referenced by the selected reference. Providing data further can include providing data that cause presentation of a page preview for the resource that is referenced by the selected reference. Providing data that cause presentation of the selected reference can include providing data that cause presentation of the selected reference at a portion of the display that is visually distinguished from another portion of the display in which the search results are presented.

Particular embodiments of the subject matter described in this specification can be implemented so as to realize one or more of the following advantages. The information provided with search result pages can be enhanced by including references to one or more resources that are relevant to a current search query, independent of whether the resources are referenced by search results for the current search query. A previously requested location resource can be referenced in a search results page that is responsive to a current location query in order to remind a user that they previously requested presentation of the previously requested location resource. The need for bookmarking of numerous resources during search sessions can thus be reduced or eliminated.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

References to resources (e.g., uniform resource locators for web pages) that were previously requested by a user through interaction with search results are provided in a search results page. In some implementations, the search results page includes a visual indication (e.g., a text indication) that the references to the previously requested resources were previously requested by the user. For example, text such as "Recently Visited Pages" can be presented next to, or above, a set of the references to the previously requested resources. The references to the previously requested resources can also be presented in a separate section of the search results page than current search so as to visually distinguish the references to the previously requested resources from the search results.

In some implementations, the previously requested resources that are referenced in the search results page are location resources for a geographic location. As used throughout this document, a location resource for a geographic location is a resource that was selected from search results that were provided in response to a search query that included a reference to the geographic location. For example, in response to receipt of the search query "Breckenridge Hotels," a search system may provide a search results page that includes a reference to a web page for Hotel A. If the user selects (e.g., clicks) this search result to request the web page for Hotel A, then the web page for Hotel A would be a location resource for the geographic location "Breckenridge, Colo."

When a subsequent search query that references Breckenridge (e.g., "Breckenridge Skiing") is received, a reference to the web page for Hotel A could be included in the search results page, irrespective of whether the web page for Hotel A was referenced by a search result that is included in the search results page. Thus, the user would be reminded that they previously requested presentation of the web page for Hotel A, and could again request the web page by selecting the reference.

As described in more detail below, the location resources that are provided to a user with a search results page can be selected from a location search profile for the user. The location search profile can specify, for example, geographic locations that have been referenced by search queries that were received from the user, and location resources that were requested through interaction with search results that were provided in response to the search queries that referenced the respective geographic locations. As used throughout this document, a search query that includes a reference to a geographic location is referred to as a location query, and the reference to the geographic location is referred to as a location phrase. The location phrase can be one or more words.

Figure 1:
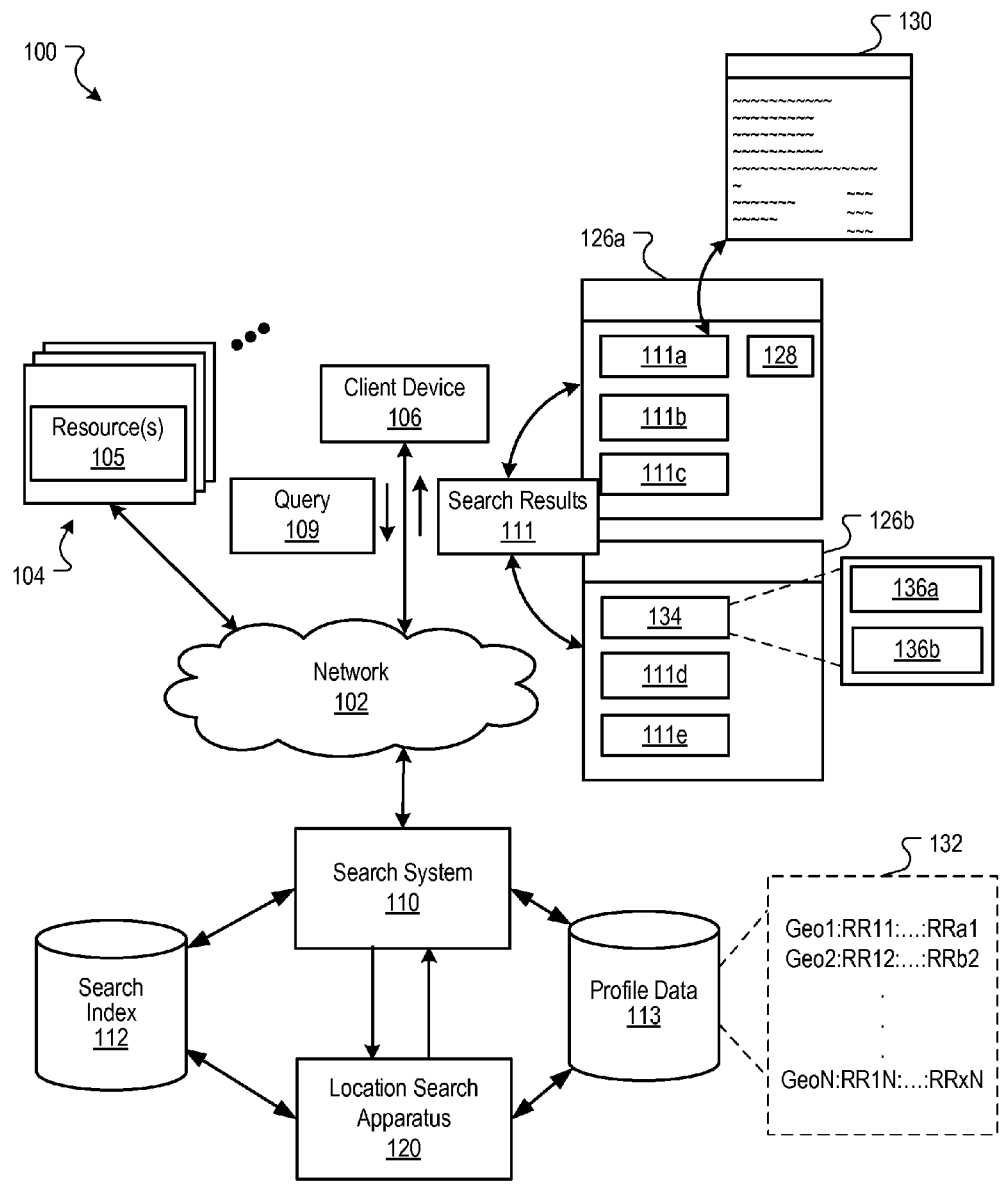
FIG. 1 is a block diagram of a search environment that facilitates resource search operations on a client device.

FIG. 1 is a block diagram of a search environment 100 that facilitates resource search operations on a client device. The example environment 100 includes a network 102, e.g., a local area network (LAN), wide area network (WAN), the Internet, or a combination of them. The network 102 connects websites 104, client devices 106, and the search system 110. The environment 100 may include many thousands of publishers and client devices 106.

A website 104 is one or more resources 105 associated with a domain name and hosted by one or more servers. An example website is a collection of Web pages formatted in hypertext markup language (HTML) that can contain text, images, multimedia content, and programming elements, e.g., scripts. Each website 104 is maintained by a publisher, e.g., an entity that manages and/or owns the website.

A resource 105 is any data that can be provided by a website 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., JavaScript scripts).

A client device 106 is an electronic device that is under control of a user and is capable of requesting and receiving resources 105 over the network 102. Example client devices 106 include personal computers, mobile communication devices, and other devices that can send and receive data over the network 102. A client device 106 typically includes a user application, e.g., a web browser, to facilitate the sending and receiving of data over the network 102.

To facilitate searching of resources 105, the search system 110 identifies the resources 105 by crawling and indexing the resources 105 provided on websites 104. Data about the resources 105 can be indexed based on the resource to which the data corresponds. The indexed and, optionally, cached copies of the resources 105 are stored in search index 112.

The client devices 106 submit search queries 109 to the search system 110. For instance, any particular search query 109 can include one or more terms consisting of words, numbers or other characters. In response to receipt of the search query 109, the search system 110 accesses (e.g., using a search engine) the search index 112 to identify resources 105 that are relevant to the search query 109. The search system 110 identifies the resources 105, generates search results 111 that identify the resources 105, and returns the search results 111 to the client devices 106.

For example, the search results 111 can include resources 105 that have been identified as having at least a threshold relevance score for the search query. A search result 111 is data generated by the search system 110 that identifies a resource 105 that is responsive to a particular search query, and includes a link to the resource 105. An example search result 111 can include a Web page title, a snippet of text or a portion of an image extracted from the Web page, and the URL of the Web page.

The search results are ranked based, at least in part, on relevance scores of the resources 105 that are referenced by the search results 111. The relevance scores can be computed, for example, based on information retrieval ("IR") scores, and optionally a quality score of each resource relative to other resources. In some implementations, the IR scores are computed from dot products of feature vectors corresponding to a search query 109 and a resource 105. Quality scores can be computed, for example, based on visual characteristics of the page, such as page layout, font sizes, and a quantity of images presented on the page. The quality scores can also be computed based on user feedback regarding page quality and/or a determination of whether the page includes, or links to a page that includes, malware (e.g., computer viruses). The search results 111 (111a-111e collectively) are ordered according to these relevance scores and provided to the client device 106 for presentation according to the order.

The client devices 106 receive the search results 111, e.g., in the form of one or more search result pages 126 (126a and 126b collectively), and render the search results 111 for presentation to users. The search results 111 include data specifying a set of resources 105 that have been identified as relevant (e.g., based on relevance scores) to the search query submitted by the client device 106. As noted above, the search results 111 can also include a "snippet" from the resource 105 that has been identified as relevant to the search query 109. For example, a snippet can be two lines of text that represent the contents of the resource 105 that is linked to by the search result 111.

In some implementations, the search system 110 provides users with preview data that cause presentation of "page previews" 128 with the search results. Page previews 128 are visual representations (e.g., images) of a web page to which a reference (e.g., a search result or another reference to a web page) links. In some implementations, images of web pages are stored in a data store that is accessible by the search system 110. The images that are stored can represent a threshold number of page pixels (e.g., 10,000 pixels) for each page. The resolution of the image can be reduced by a reduction factor (e.g., ⅓) to reduce the amount of data stored for each web page. When a page preview is selected to be presented to a user, a portion of the page preview (e.g., ⅓ of the reduced resolution representation) can be selected to be presented to the user.

Using the client device 106, a user can interact with the search results 111 to request presentation of the resources that are referenced by the search results 111. For example, a user can request presentation of resource 130 by selecting (i.e., click on) search result 111a. Following presentation of the resource 130, the user can return to the search results page 126a, for example, by clicking a "back" button in a browser or another navigational element that redirects the user to the search results page. The user can then request other resources by interacting with additional search results (e.g., 111b and/or 111c) or submit a different search query to obtain other search results. The user can continue to iteratively submit search queries and/or request presentation of resources in an effort to obtain information that satisfies the user's informational need.

For example, a user that is planning a vacation may first submit the query "Breckenridge Skiing," in an effort to obtain information to plan a trip to Breckenridge. The user may request presentation of some of the resources that are referenced by the search results that are included in the search results page. For example, the user may request presentation of a webpage for a ski shop in Breckenridge.

The user may also submit the search queries "Breckenridge Hotels," "Airfare Breckenridge," and/or other search queries to attempt to obtain information for planning their trip. The user may also request additional resources from one or more of the search results pages that are provided in response to these search queries. Through this process the user may be exposed to a number of different resources that provide information for which the user is searching. However, the user may not remember which resources have been requested, or even the specific search queries in response to which the resources were referenced. Thus, it may be difficult for the user to navigate back to previously viewed resources at a later time.

When a user iteratively searches for information about a particular topic, the search queries that are entered by the user will often have some commonality. For example, when a user is planning a vacation (e.g., to Breckenridge, Colo.), many of the search queries will likely include a reference to Breckenridge. The reference could be inclusion of "Breckenridge" a postal code for Breckenridge, or some other indication of the geographic location of Breckenridge (e.g., latitude/longitude coordinates for Breckenridge or a name of a mountain in Breckenridge). As described in more detail below, the commonality between the search queries that are related to a same topic can be used to track a set of previously requested resources that are related to the same topic. When a user subsequently submits a search query related to the same topic, the system can provide data indicating resources related to the topic and that the user previously selected to remind the user of the resources.

One example system to realize these features is a location search profile apparatus 120. The location search profile apparatus 120 that creates a location search profile 132 for a user. In some implementations, the search profile apparatus 120 creates a location profile for users that have requested a location profile be created. For example, a user can be provided with information indicating types of information that will be collected to create a location profile, and presented user interface elements that enable the user to specify whether collection of this information and/or creation of the location profile are approved by the user. In response to the user approving creation of the location profile, the location search profile apparatus 120 creates the location profile for the user, as described in more detail below. The location search profile can be stored, for example, in a profile database 113.

The location search profile for a user specifies a plurality of geographic locations (e.g., Geo1, Geo2, . . . , GeoN) that were referenced by search queries that were previously received from the user. For example, each of the queries that were received from the user in the example above included a reference to the city "Breckenridge." Thus, the location search profile 132 for that user would include a reference to Breckenridge. In some implementations, the geographic locations that are specified in a user profile can be expanded, for example, to include a reference to a state (or another area that is defined by a political boundary) and/or one or more postal codes that are associated with a geographic location. For example, the reference to Breckenridge could be expanded to be Breckenridge, Colo. or Breckenridge 80424.

The location search profile 132 for a user also specifies, for each of the geographic locations, a set of references to resources (e.g., RR11: . . . :RRa1; RR12: . . . :RRb2; RR1N: . . . :RRxN) that were requested by the user. Each resource that is referenced in the profile can be, for example, a resource that the user requested by interacting with a search result that was presented in response to a search query that referenced the geographic location. For example, the set of references to resources for the geographic location Breckenridge can include uniform resource locators (URLs) for one or more webpages to which the user was redirected in response to clicking on the search results that were provided in response to the queries "Breckenridge Hotels" and/or "Airfare Breckenridge." An example process by which the location search profile apparatus 120 creates a location search profile 132 is described in more detail with reference to FIGS. 2 and 4.

When a search query 109 is received by the search system 110, the search system 110 can determine whether the search query 109 was received from a user for which a location search profile 132 exists. For example, if a user has logged in to a user account, the search query 109 may be submitted with data specifying a unique and/or anonymized user identifier that is associated with the user. In this example, the search system 110 can access the profile data store 113, and determine whether the user identifier is associated with a location search profile 132 in the profile data store 113. If the user identifier is associated with a location search profile 132, the search system 110 can then determine whether the location search profile 132 includes a reference to a geographic location (e.g., Geo1) that is referenced by the search query 109. If the location search profile 132 does include a reference to the geographic location (e.g., Geo1) that is referenced by the search query 109, then the search system 110 can select one or more resource references (e.g., RR11) that are associated with (i.e., indexed according to and/or stored with a reference to) the geographic location. In turn, the search system 110 can provide data to the client device 106 that causes presentation of the selected reference as well as search results 111 that are responsive to the search query 109.

FIG. 1 includes a depiction of an example search results page 126b that includes search results 111d and 111e as well as a set of references 134 to one or more resources that were previously requested by the user through user interaction with previous search results. For example, the set of reference 134 can include a reference 136a (e.g., a URL) to a previously requested web page for a ski shop in Breckenridge, while another reference 136b in the set of references 134 can include a reference (e.g., a URL) to a previously requested webpage for a hotel in Breckenridge. In some implementations, the search results page 126b can include an indication that the set of resources 134 have been previously requested by the user. For example, the text "previously requested resources" can be presented with the set of references 134. In some implementations, the search results page 126b can also include snippets and/or page previews for the resources that are referenced by the set of references 134.

Figure 2:
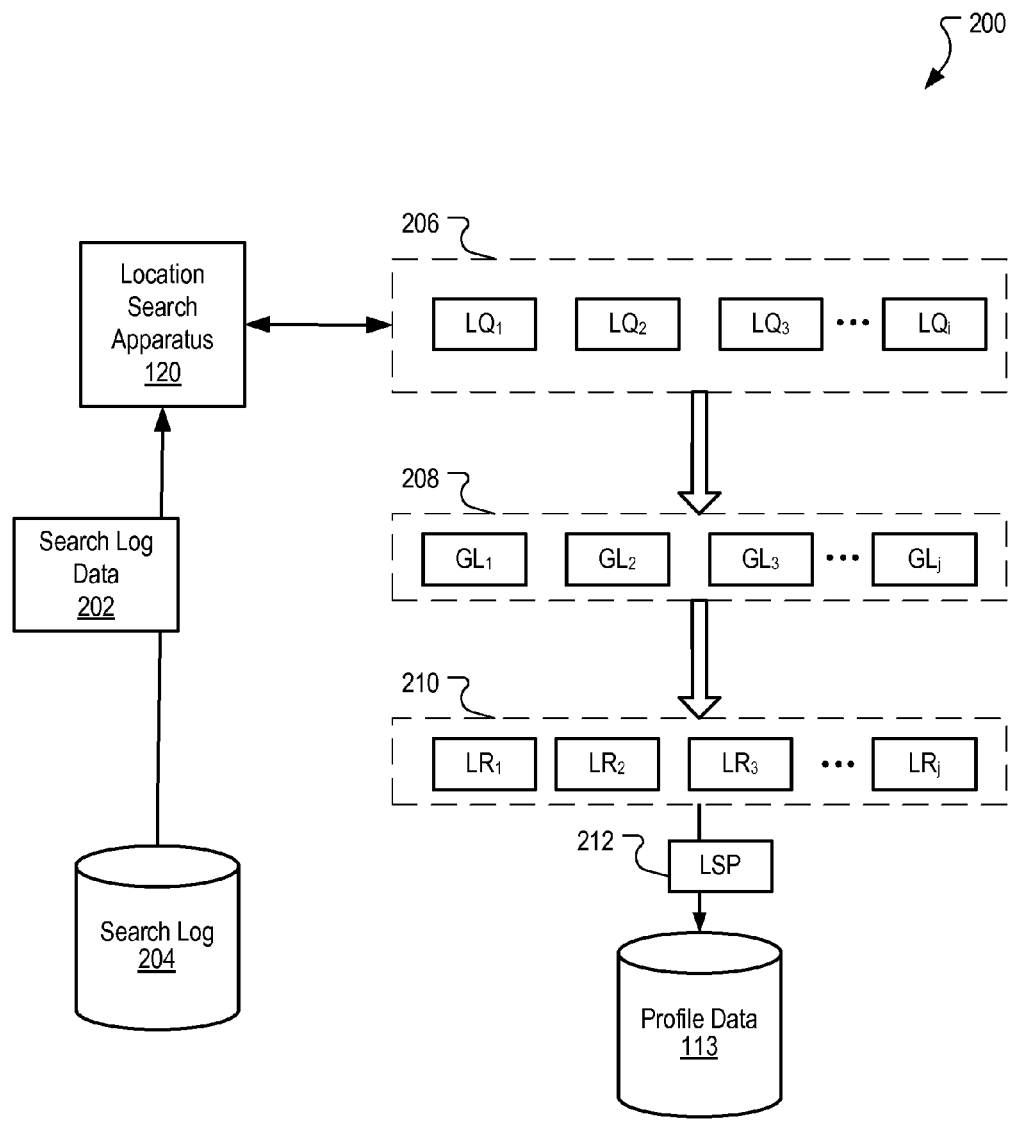
FIG. 2 is an example data flow for creating a location search profile for a user.

FIG. 2 is an example data flow 200 for creating a location search profile for a user. The flow 200 begins with the location search profile apparatus 120 receiving search log data 202 from a search log 204. The search log 204 is a data store that stores search log data 202 that specify search queries that were previously received from user devices. The search log data 202 also specify user interactions with search results that were provided in response to the search queries (i.e., responsive search results). The search log data 202 can be anonymized so that the privacy of users is protected. For example, quasi-unique identifiers can be associated with users, but the actual identifying information of the users is not stored in the search log data 202. Additionally, any identified user preferences or user interactions can be generalized (for example, generalized based on user demographics) rather than associated with a particular user. Encryption and obfuscation techniques can also be used to protect the privacy of users.

The location search profile apparatus 120 analyzes the search log data 202 to identify a set of location queries 206 (e.g., LQ1, LQ2, LQ3, . . . , LQi) that is associated with a particular anonymized user identifier. For example, the search log data 202 can identify each location query (e.g., LQ1, LQ2, LQ3, . . . , LQi) that is associated with the particular anonymized user identifier and designate the identified location queries as the set of location queries 206 for the particular anonymized user identifier. As described above, location queries are search queries that include a reference to a geographic location, such as the name of a city, latitude/longitude coordinates, a zip code, etc.

The location search profile apparatus 120 analyzes the set of location queries 206 to identify a set of geographic locations 208 that are referenced by the set of location queries 206. In some implementations, the location search profile apparatus 120 parses each location query in the set 206 and identifies terms in the location query that reference a geographic location. For example, the location search profile apparatus 120 can compare each term in the location query to a corpus of location terms that reference corresponding geographic locations. When the location search profile apparatus 120 identifies a match between a term in a location query and a location term in the corpus, the location search profile apparatus 120 can determine that the location query references the matching geographic location in the corpus. If the geographic location is already included in the set of geographic locations 208, the location search profile apparatus 120 can simply associate the location query with the appropriate geographic location (e.g. GL1, GL2, GL3, . . . , or GLj) in the set 208. If the geographic location is not included in the set of geographic locations 208, the location search profile apparatus 120 can create a new reference to the geographic location in the set 208 and associate the location query with the newly referenced geographic location.

The location search profile apparatus 120 selects, for each geographic location (e.g., GL1) in the set of geographic locations 208 a corresponding set of location resources (e.g., {LR1}) for the geographic location. Each set of location resources (e.g., {LR1}) includes resources that were previously requested by the user through interaction with responsive search results for the geographic location (i.e., search results that were provided in response to a location query that referenced the corresponding geographic location (e.g., GL1)). For example, the location resources for "Breckenridge" can include each resource that was requested by the user by interacting with a search result that was provided in response to a search query that included a reference to Breckenridge. The sets of location resources (e.g., {LR1}, {LR2}, {LR3}, . . . , {LRj}) for the set of geographic locations 208 are collectively referred to as a set of location resources for the user 210.

The set of location resources for the user 210 are included in a location search profile 212 for the user. Each reference to a location resources that is included in the location search profile 212 for the user can be associated with (e.g., indexed according to and/or stored with a reference to) one or more references to the particular geographic location (e.g., GL1) for which the resource is a location resource. In some implementations, the references to the particular geographic location are one or more labels (e.g., text labels) that are representative of the geographic location. For example, the references to Breckenridge can include the labels "Breckenridge," "Breckenridge, Colo.," and/or 80424, which is the postal code for Breckenridge. The location search profile (LSP) 212 can be stored, for example, in the profile data store 113, and used by the search system 110 and/or the location search profile apparatus 120, as described above and with reference to FIG. 3 below.

Figure 3:
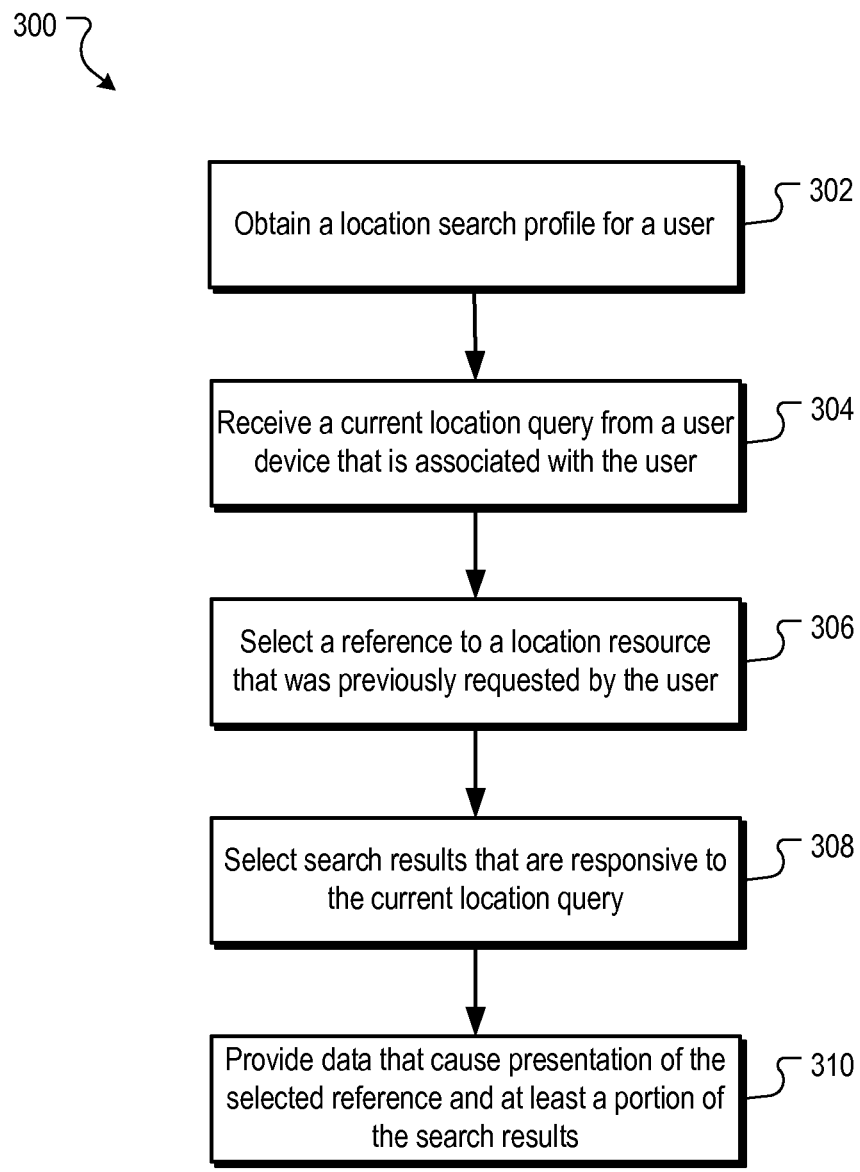
FIG. 3 is a flow chart of an example process for providing a reference to a previously requested resource with search results.

FIG. 3 is a flow chart of an example process 300 for providing a reference to a previously requested location resource with a set of search results. In some implementations, the reference to the previously requested location resource can be provided with the search results irrespective of whether the reference is included in the search results. For example, a reference to a web page for a hotel in Breckenridge may be presented with the search results that are responsive to the search query "Breckenridge Ski Shop," even if the reference to the web page for the hotel is not included in the search results (or a first page of search results) that are provided in response to the search query. The reference may be provided if, for example, the user had previously selected the web page for a hotel during a recent search session.

The process 300 can be implemented, for example, by the location search apparatus 120 and/or the search system 110 of FIG. 1. In some implementations, the location search apparatus 120 is a data processing apparatus that includes one or more processors that are configured to perform actions of the process 300. In other implementations, a computer readable medium can include instructions that when executed by a computer cause the computer to perform actions of the process 300.

A location search profile for a user is obtained (302). In some implementations, the location search profile specifies references to multiple different geographic locations. Each geographic location that is specified by the location search profile is a geographic location that was referenced by at least one previous location query that was previously received from a user device. For example, assume that a particular user (e.g., as identified by a unique anonymized user identifier) submitted the search queries "Breckenridge Hotels," and "Tahoe Hotels." In this example, the geographic locations that are referenced by the location search profile for the user would include "Breckenridge" and "Tahoe," since each of these locations was referenced by a location query that was received from the user.

In some implementations, the location search profile for the user also specifies, for each geographic location in the profile, a set of references to location resources that were previously requested from a search results page by the user. The set of references for a particular geographic location can include, for example, a reference to each resource that was requested in response to user interaction with search results that were previously provided in response to the location query. For example, assume that the user previously submitted the location query "Breckenridge Hotels," and, in response to the search query," received a search results page that included these search results that respectively referenced web pages for Hotel A, Hotel B, and Hotel C. If the user then clicked on the search result for Hotel A, then a reference to the web page for Hotel A would be included in the location search profile for the user. If the user subsequently returned to the search results page, and selected the search result for Hotel C, then a reference to the web page for Hotel C would also be included in the location search profile. If the user did not click on the search result for Hotel B, then no reference to the web page for hotel B would be included in the location search profile for the user.

A current location query is received from a user device that is associated with the user (304). In some implementations, the current location query specifies a current location phrase that references a particular geographic location. For example, if the current location query is the query "Las Vegas Casinos," the current location phrase is the phrase "Las Vegas," which references the location Las Vegas, Nev., USA.

The user device can be associated with the user, for example, by being a user device from which a user account for the user was accessed (e.g., using a secured log-in process). In some implementations, the user account is associated with data indicating that the user has requested creation of a location profile, for example, through an opt-in process similar to that described above. Alternatively, the user device can be associated with a user that has opted-in to creation of a location profile by way of a cookie that is stored on the user device from which the user opted-in. When a cookie is used as a user identifier, all search queries submitted and resources requested can be assumed to be received from a single user even though many different actual users may be using the user device.

In some implementations, a determination is made whether the location search profile for the user includes a reference to a geographic location that matches the particular geographic location that is referenced by the current location query. For example, the reference to the particular location can be compared to a set of geographic locations that are referenced by the location search profile to identify a match.

A match can be determined to exist, for example, when the current location phrase is exactly the same as a reference to a geographic location in the location search profile. For example, if the current location phrase is "Breckenridge," then the location phrase will match the reference "Breckenridge," in the location search profile. A match can also exist even when an exact match does not exist. For example, the location phrase "80424" can be determined to match the reference "Breckenridge, Colo." in the location search profile since each of the references refers to Breckenridge, Colo.

In some implementations, a match can also be determined to exist when the current location phrase references a particular geographic location that is within a threshold distance (e.g., 50 miles) of the geographic location that is referenced in the location search profile. For example, the current location phrase "Keystone, Colo.," can be determined to match the reference "Breckenridge, Colo." in the location search profile since Keystone, Colo. is 15 miles from Breckenridge, Colo. (e.g., assuming a threshold distance of at least 16 miles). If a match between the reference to the particular location and a geographic location in the set is determined to not exist, a new current location query can be received from the user device. Otherwise the process continues, as described below.

A reference to a location resource that was previously requested by the user is selected (306). In some implementations, each reference to a location resource is associated with one or more labels that specify a representative geographic location for which the reference is a location resource. The labels for a particular location resource can be, for example, the location phrases of the location queries for which a search result for the location resource was presented to the user, and selected by the user. For example, if a search result referencing the web page for Hotel A was provided to a user in response to the search query "Keystone, Colo. Hotels," and subsequently clicked by the user, a label for the web page can be "Keystone, Colo." The selection of labels for a location resource is described in more detail with reference to FIG. 4.

These labels can be used to select references to location resources in response to receiving a current location query. For example, labels that match the current location phrase can be selected in response to receiving the current location query. As described above, a match can exist when there is an exact match, or using match criteria that define a match. For example, a label that references a geographic location that is within a threshold distance of the particular geographic location referenced by the current location phrase can be considered to match the current location phrase. In this example, assuming that the threshold distance is at least 16 miles, the current location phrase "Keystone, Colo.," can be considered to match the label "Breckenridge, Colo.," such that references to location resources for Breckenridge can be selected in response to the location query "Keystone, Colo., hotels"

In some implementations, the reference that is selected is a reference to a location resource (or a threshold number of location resources) that was most recently requested by the user. For example, assume that the web page for Hotel A was requested by the user (e.g., by clicking a search result) two days ago, and that the web page for Hotel C was requested by the user 12 hours ago. In this example, the reference to the web page for Hotel C will be selected over the reference to the web page for Hotel A (assuming that only one reference was being selected), since web page C was more recently requested by the user.

Search results that are responsive to the current location query are selected (308). In some implementations, the search results are selected or generated based on relevance scores, as described with reference to FIG. 1.

Data that cause presentation of the selected reference and at least a portion of the search results are provided to the user device (310). In some implementations, the data that are provided further cause presentation of a date or time at which the resource that is referenced by the selected was requested by the user. For example, a date and/or time of day at which the user clicked on a search result that redirected the user to a web page can be presented with the selected reference. In some implementations, the data that are provided can also cause presentation of a "snippet" and/or a page preview for the resource that is reference by the selected reference, as described with reference to FIG. 1.

The data can further cause the selected reference to be presented in a manner that visually distinguishes the selected reference from the search results. For example, the data can cause the selected reference to be presented in a "boxed" portion of the search results page. The data can further cause presentation of an indication that the resource(s) that are referenced (e.g., hyperlinked to) by the selected reference has been previously requested by the user through user interaction with previous search results. For example, the data can cause presentation of text identifying the selected reference as a reference to a location resource for a particular geographic location.

Figure 4:
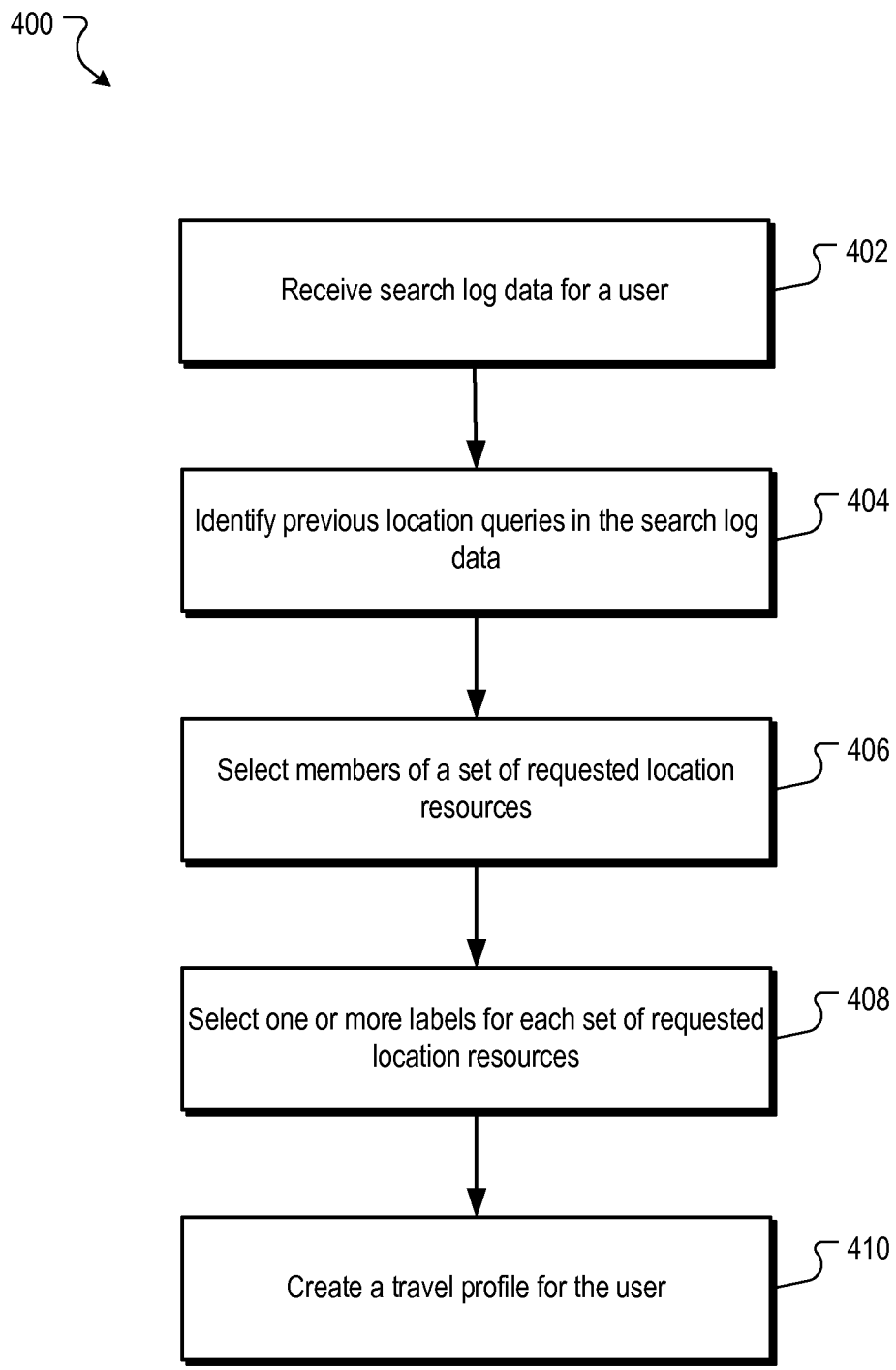
FIG. 4 is a flow chart of an example process for creating a location search profile for a user.

FIG. 4 is a flow chart of an example process 400 for creating a location search profile for a user. The process 400 is a process by which previously received location queries are identified from search log data. Location resources (i.e., resources that were previously requested through user interaction with search results) are grouped based on the location phrase that was specified by the location query for which the search results were provided. Labels are selected for each group of location resources, and the location search profile is created using the groups of location resources.

The process 400 can be implemented, for example, by the location search apparatus 120 and/or the search system 110 of FIG. 1. In some implementations, the location search apparatus 120 is a data processing apparatus that includes one or more processors that are configured to perform actions of the process 400. In some implementations, a computer readable medium can include instructions that when executed by a computer cause the computer to perform actions of the process 400.

Search log data for a user are received (402). The search log data are received, for example, from a search log data store, as described with reference to FIG. 2. In some implementations, the search log data specify one or more previous location queries that were previously submitted from a user device that is associated with the user. The search log data can also specify, for each of the previous location queries, references (e.g., URLs) to previously requested location resources. The referenced location resources can be, for example, resources that were previously requested by the user through interaction with previous search results that were provided in response to the previous location query.

The previous location queries are identified from the search log data (404). As described with reference to FIG. 2, each of the search queries in the search log data can be analyzed to determine whether the search query includes a location phrase. The search queries that include a location phrase can be identified as location queries. In some implementations, previous location queries that reference different geographic locations that are within a threshold distance of each other are identified and/or grouped together. For example, location queries that include the location phrases "Breckenridge, Co," and "Keystone, Colo.," may be identified and/or grouped together (assuming that the threshold distance is at least 16 miles) as previous location queries for each of the geographic locations.

Previously requested location resources for a particular geographic location are selected as members of a set of requested location resources (406). In some implementations, the previously requested location resources for a particular geographic location include those resources that were requested through user selection of search results that were provided in response to location queries for the particular geographic location. For example, the set of requested location resources for "Breckenridge, Colo." can include each resource that was requested in response to a search query that was identified as a location query for Breckenridge.

One or more labels are selected for each set of requested location resources (408). In some implementations, each selected label specifies a representative geographic location for the set of requested location resources. As described above, the labels can include city names, postal codes, and other geographic identifiers. In some implementations, multiple labels for a same geographic location are selected for the set of requested location resources. For example, a zip code for Breckenridge can be used as one label for a set of requested location resources, while the city name "Breckenridge," can also be used as a label for the same set of requested location resources.

A location search profile is created for the user (410). In some implementations, the location search profile is created by indexing each set of requested location resources according to the labels for the set, and a unique identifier for the user.

Figure 5:
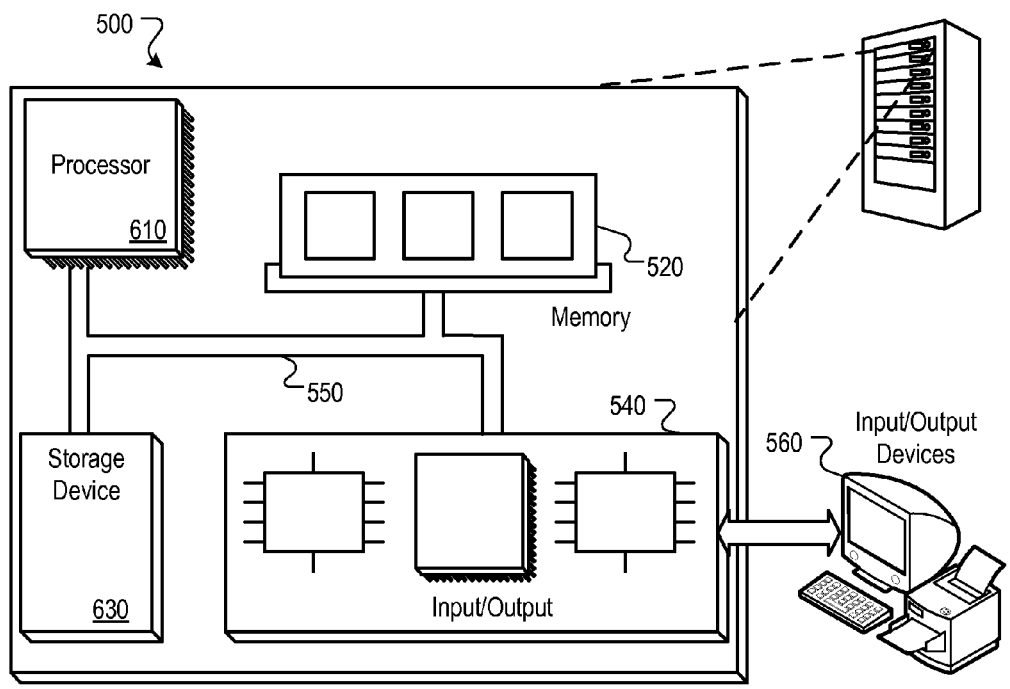
FIG. 5 is block diagram of an example computer system that can be used to providing a reference to a previously requested resource with search results.

FIG. 5 is block diagram of an example computer system 500 that can be used to providing a reference to a previously requested resource with search results, as described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
  storing, by one or more processors, information that identifies:
    (i) a previous search query that was submitted by a user and that referenced a geographic location, and

(ii) a selected resource that user input requested through user interaction with presentation of a previous search result that was presented in response to the previous search query;

receiving, by one or more processors from a user device operated by the user, a current location query referencing the geographic location;

identifying, by one or more processors and in response to receiving the current location query, a set of search results that are responsive to the current location query, each of the search results in the set of search results being responsive to the current location query;

determining, by one or more processors and in response to receiving the current location query, that the geographic location referenced by the current location query was also referenced by the previous search query;

identifying, by one or more processors in response to determining that the geographic location referenced by the current location query was also referenced by the previous search query, that the user input requested the selected resource through interaction with the presentation of the previous search result that was presented in response to the previous search query;

identifying, by one or more processors using the information that identifies the previous search query and the selected resource, and in response to identifying that the user input requested the selected resource, that a particular search result for the selected resource is not included in the set of search results that are responsive to the current location query; and providing, by one or more processors and for presentation at the user device with the set of search results that are responsive to the current location query, in response to identifying that the particular search result for the selected resource is not included in the set of search results, a search result for the selected resource.

2. The method of claim 1, further comprising:

receiving, for the user, search log data specifying one or more previous location queries including the previous search query that were previously submitted by the user;

identifying, for each of the one or more previous location queries, references to resources that were previously requested by the user when the resources were provided in response to the previous location queries, the resources including the selected resource;

creating a location search profile for the user using the search log data, the location search profile specifying one or more geographic locations including the geographic location that were respectively referenced by the one or more previous location queries; and storing, in association with each of the geographic locations, data specifying one or more resources that were requested through user interaction with search results presented to the user in response to the previous location queries that referenced the geographic location.

3. The method of claim 2, wherein determining that the geographic location referenced by the current location query was also referenced by the previous search query comprises identifying the geographic location in the location search profile that matches the geographic location of the current location query.

4. The method of claim 2, wherein identifying that the user input requested the selected resource through interaction with the previous search result that was presented to the user in response to the previous search query comprises identifying data representing the selected resource in the location search profile that is associated with the geographic location.

5. The method of claim 1, further comprising:

identifying, in response to determining that the previous search query references the geographic location, that second user input requested a second selected resource through interaction with presentation of a second previous search result that was presented in response to a second previous search query that was submitted by the user and that referenced the geographic location;

identifying, in response to identifying that the second user input requested the second selected resource, that a search result for the second selected resource is not included in the set of search results that are responsive to the current location query; and determining that the selected resource was requested by the user more recently than the second selected resource, wherein providing a search result for the selected resource comprises providing, for presentation at the user device with the set of search results that are responsive to the current location query, the search result for the selected resource in response to determining that the selected resource was requested by the user more recently than the second selected resource without providing a second search result for the second selected resource with the set of search results that are responsive to the current location query.

6. The method of claim 1, wherein providing, with the set of search results that are responsive to the current location query, the search result for the selected resource comprises providing, with the search result for the selected resource, an indication that the user previously requested the selected resource.

7. The method of claim 6, wherein providing the indication that the user previously requested the selected resource comprises generating and providing data including instructions that upon execution by the user device cause the user device to present, with the search result for the selected resource, a date or time at which the user previously selected the selected resource.

8. The method of claim 6, wherein providing the indication that the user previously requested the selected resource comprises providing data that cause the user device to present a visual representation of the selected resource with the search result for the selected resource.

9. The method of claim 6, wherein providing the indication that the user previously requested the selected resource comprises providing data that cause the user device to present the search result for the selected resource at a portion of a display that is visually distinguished from another portion of the display in which the set of search results that are responsive to the current location query are presented.

10. The method of claim 1, wherein providing, with the set of search results that are responsive to the current location query, the search result for the selected resource comprises providing, with the search result for the selected resource, data that cause the user device to present a visual representation of the selected resource.

11. A system comprising:

a data store storing information that identifies:

(i) a previous search query that was submitted by a user and that referenced a geographic location, and (ii) a selected resource that user input requested through user interaction with presentation of a previous search result that was presented in response to the previous search query; and one or more data processing apparatus that interact with the data store and execute instructions that cause the one or more data processing apparatus to perform operations comprising:

storing, in the data store, the information that identifies:
(i) the previous search query that was submitted by the user and that referenced the geographic location, and
(ii) the selected resource that user input requested through user interaction with presentation of the previous search result that was presented in response to the previous search query;

receiving, from a user device operated by the user, a current location query referencing the geographic location;

identifying, in response receiving to the current location query, a set of search results that are responsive to the current location query, each of the search results in the set of search results being responsive to the current location query;

determining, in response to receiving the current location query, that the geographic location referenced by the current location query was also referenced by the previous search query;

identifying, by one or more processors in response to determining that the geographic location referenced by the current location query was also referenced by the previous search query, that the user input requested the selected resource through interaction with the presentation of the previous search result that was presented in response to the previous search query;

identifying, using the information that identifies the previous search query and the selected resource, and in response to identifying that the user input requested the selected resource, that a particular search result for the selected resource is not included in the set of search results that are responsive to the current location query; and providing, for presentation at the user device with the set of search results that are responsive to the current location query, in response to identifying that the particular search result for the selected resource is not included in the set of search results, a search result for the selected resource.

12. The system of claim 11, wherein the instructions cause the one or more data processing apparatus to perform operations further comprising:

receiving, for the user, search log data specifying one or more previous location queries including the previous search query that were previously submitted by the user;

identifying, for each of the one or more previous location queries, references to resources that were previously requested by the user when the resources were provided in response to the previous location queries, the resources including the selected resource;

creating a location search profile for the user using the search log data, the location search profile specifying one or more geographic locations including the geographic location that were respectively referenced by the one or more previous location queries; and associating, with each of the geographic locations, one or more resources that were requested through user interaction with search results presented to the user in response to the previous location queries that referenced the geographic location.

13. The system of claim 12, wherein determining that the geographic location referenced by the current location query was also referenced by the previous search query comprises identifying the geographic location in the location search profile that matches the geographic location of the current location query.

14. The system of claim 12, wherein identifying that the user input requested the selected resource through interaction with the previous search result that was presented to the user in response to the previous search query comprises identifying data representing the selected resource in the location search profile that is associated with the geographic location.

15. The system of claim 11, wherein providing, with the set of search results that are responsive to the current location query, the search result for the selected resource comprises providing, with the search result for the selected resource, an indication that the user previously requested the selected resource.

16. The system of claim 15, wherein providing the indication that the user previously requested the selected resource comprises generating and providing data including instructions that upon execution by the user device cause the user device to present, with the search result for the selected resource, a date or time at which the user previously selected the selected resource.

17. The system of claim 15, wherein providing the indication that the user previously requested the selected resource comprises providing data that cause the user device to present a visual representation of the selected resource with the search result for the selected resource.

18. The system of claim 15, wherein providing the indication that the user previously requested the selected resource comprises providing data that cause the user device to present the search result for the selected resource at a portion of a display that is visually distinguished from another portion of the display in which the set of search results that are responsive to the current location query are presented.

19. A non-transitory computer readable medium storing instructions that upon execution by one or more data processing apparatus cause the one or more data processing apparatus to perform operations comprising:

storing information that identifies:
(i) a previous search query that was submitted by a user and that referenced a geographic location, and
(ii) a selected resource that user input requested through user interaction with presentation of a previous search result that was presented in response to the previous search query;

receiving, from a user device operated by the user, a current location query referencing the geographic location;

identifying, in response to receiving the current location query, a set of search results that are responsive to the current location query, each of the search results in the set of search results being responsive to the current location query;

determining, in response to receiving the current location query, that the geographic location referenced by the current location query was also referenced by the previous search query;

identifying, by one or more processors in response to determining that the geographic location referenced by the current location query was also referenced by the previous search query, that the user input requested the selected resource through interaction with the presentation of the previous search result that was presented in response to the previous search query;

identifying, using the information that identifies the previous search query and the selected resource, and in response to identifying that the user input requested the selected resource, that a particular search result for the selected resource is not included in the set of search results that are responsive to the current location query; and providing, for presentation at the user device with the set of search results that are responsive to the current location query, in response to identifying that the particular search result for the selected resource is not included in the set of search results, a search result for the selected resource.

20. The computer readable medium of claim 19, wherein the instructions cause the one or more data processing apparatus to perform operations further comprising:

receiving, for the user, search log data specifying one or more previous location queries including the previous search query that were previously submitted by the user;

identifying, for each of the one or more previous location queries, references to resources that were previously requested by the user when the resources were provided in response to the previous location queries, the resources including the selected resource;

creating a location search profile for the user using the search log data, the location search profile specifying one or more geographic locations including the geographic location that were respectively referenced by the one or more previous location queries; and associating, with each of the geographic locations, one or more resources that were requested through user interaction with search results presented to the user in response to the previous location queries that referenced the geographic location.

21. The computer readable medium of claim 20, wherein:

determining that the geographic location referenced by the current location query was also referenced by the previous search query comprises identifying the geographic location in the location search profile that matches the geographic location of the current location query; and identifying that the user input requested the selected resource through interaction with the previous search result that was presented to the user in response to the previous search query comprises identifying data representing the selected resource in the location search profile that is associated with the geographic location.

22. The computer readable medium of claim 19, wherein providing, with the set of search results that are responsive to the current location query, the search result for the selected resource comprises providing, with the search result for the selected resource, an indication that the user previously requested the selected resource.

23. The computer readable medium of claim 22, wherein providing the indication that the user previously requested the selected resource comprises generating and providing data including instructions that upon execution by the user device cause the user device to present, with the search result for the selected resource, a date or time at which the user previously selected the selected resource.

24. The computer readable medium of claim 22, wherein providing the indication that the user previously requested the selected resource comprises providing data that cause the user device to present a visual representation of the selected resource with the search result for the selected resource.

25. The computer readable medium of claim 22, wherein providing the indication that the user previously requested the selected resource comprises providing data that cause the user device to present the search result for the selected resource at a portion of a display that is visually distinguished from another portion of the display in which the set of search results that are responsive to the current location query are presented.

* * * * *